United States Patent
Kadosawa

(10) Patent No.: US 10,490,095 B2
(45) Date of Patent: Nov. 26, 2019

(54) ROBOT CONTROL DEVICE, STUDENT ROLE-PLAYING ROBOT, ROBOT CONTROL METHOD, AND ROBOT CONTROL SYSTEM

(71) Applicant: CASIO COMPUTER CO., LTD., Shibuya-ku, Tokyo (JP)

(72) Inventor: Kaori Kadosawa, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 183 days.

(21) Appl. No.: 15/391,825

(22) Filed: Dec. 27, 2016

(65) Prior Publication Data

US 2017/0278414 A1   Sep. 28, 2017

(30) Foreign Application Priority Data

Mar. 23, 2016  (JP) .................................. 2016-059276

(51) Int. Cl.
*A63F 9/24* (2006.01)
*G09B 7/00* (2006.01)
*G09B 5/04* (2006.01)

(52) U.S. Cl.
CPC ................. *G09B 7/00* (2013.01); *G09B 5/04* (2013.01)

(58) Field of Classification Search
CPC ..................................... G09B 7/00; G09B 7/02
See application file for complete search history.

(56) References Cited

U.S. PATENT DOCUMENTS

| 4,439,161 | A | * | 3/1984 | Wiggins | G09B 7/04 434/201 |
| 5,413,355 | A | * | 5/1995 | Gonzalez | A63F 9/183 273/302 |
| 6,149,490 | A | * | 11/2000 | Hampton | A63H 3/28 446/298 |
| 6,160,986 | A | * | 12/2000 | Gabai | G09B 5/04 434/307 R |
| 6,463,257 | B1 | * | 10/2002 | Wood | A63H 3/28 434/308 |
| 10,086,302 | B2 | * | 10/2018 | Boeckle | A63H 3/28 |
| 2003/0059757 | A1 | * | 3/2003 | Wood | A63H 3/28 434/308 |

(Continued)

FOREIGN PATENT DOCUMENTS

JP       2001242780 A     9/2001
WO   WO 2018044230 A1 *  3/2018  ............... G09B 5/06

*Primary Examiner* — Steve Rowland
(74) *Attorney, Agent, or Firm* — Holtz, Holtz & Volek PC

(57) ABSTRACT

A robot control device and the like capable of improving the motivation of a learner for learning is provided. A controller of a communication terminal controls behavior of a student role-playing robot so that the student role-playing robot responds to a user in a position of a student learning together with the user. The controller of the communication terminal comprises an behavior mode selector, a student role-playing robot behavior controller, and a teacher role-playing robot behavior controller. The student role-playing robot behavior controller controls behavior of the student role-playing robot based on one or more behavior modes selected by the behavior mode selector. The teacher role-playing robot behavior controller makes the teacher role-playing robot perform behavior collaborative with behavior of the student role-playing robot.

10 Claims, 6 Drawing Sheets

(56) References Cited

U.S. PATENT DOCUMENTS

2010/0167623 A1* 7/2010 Eyzaguirre .............. A63H 3/28
                                                    446/330
2013/0130587 A1* 5/2013 Cohen ................... A63H 30/04
                                                    446/175

* cited by examiner

ROBOT CONTROL DEVICE, STUDENT ROLE-PLAYING ROBOT, ROBOT CONTROL METHOD, AND ROBOT CONTROL SYSTEM

CROSS-REFERENCE TO RELATED APPLICATION

This application claims the benefit of Japanese Patent Application No. 2016-059276, filed on Mar. 23, 2016, the entire disclosure of which is incorporated by reference herein.

FIELD

This application relates generally to a technique of improving the effect of learning on a learner (user) with the use of a robot.

BACKGROUND

Recently, educational methods using robots have been proposed. For example, Unexamined Japanese Patent Application Kokai Publication No 2001-242780 discloses a humanoid robot educating a learner (user) as a teacher.

Learners are sometimes inspired and more motivated for learning through communication with other students besides communication with teachers. For example, learners may be more motivated for learning through competition with other students or when encouraged by other students.

Even with the humanoid robot of the Unexamined Japanese Patent Application Kokai Publication No 2001-242780, a learner cannot have communication with other students in a circumstance where there are no other students (for example, at home). Therefore, the effect of increasing the motivation of a learner for learning is low.

Particularly, when a learner is an infant or child, it is said that the learner feels pressure in a learning circumstance where a learner and a teacher sit face to face.

SUMMARY

In order to achieve the above objective, the robot control device according to an exemplary aspect of the present disclosure controls behavior of a student role-playing robot so that the student role-playing robot responds to a user in a position of a student learning together with the user.

BRIEF DESCRIPTION OF THE DRAWINGS

A more complete understanding of this application can be obtained when the following detailed description is considered in conjunction with the following drawings, in which.

DETAILED DESCRIPTION

Embodiment

An embodiment of the present disclosure will be described hereafter with reference to the drawings.

Figure 1:
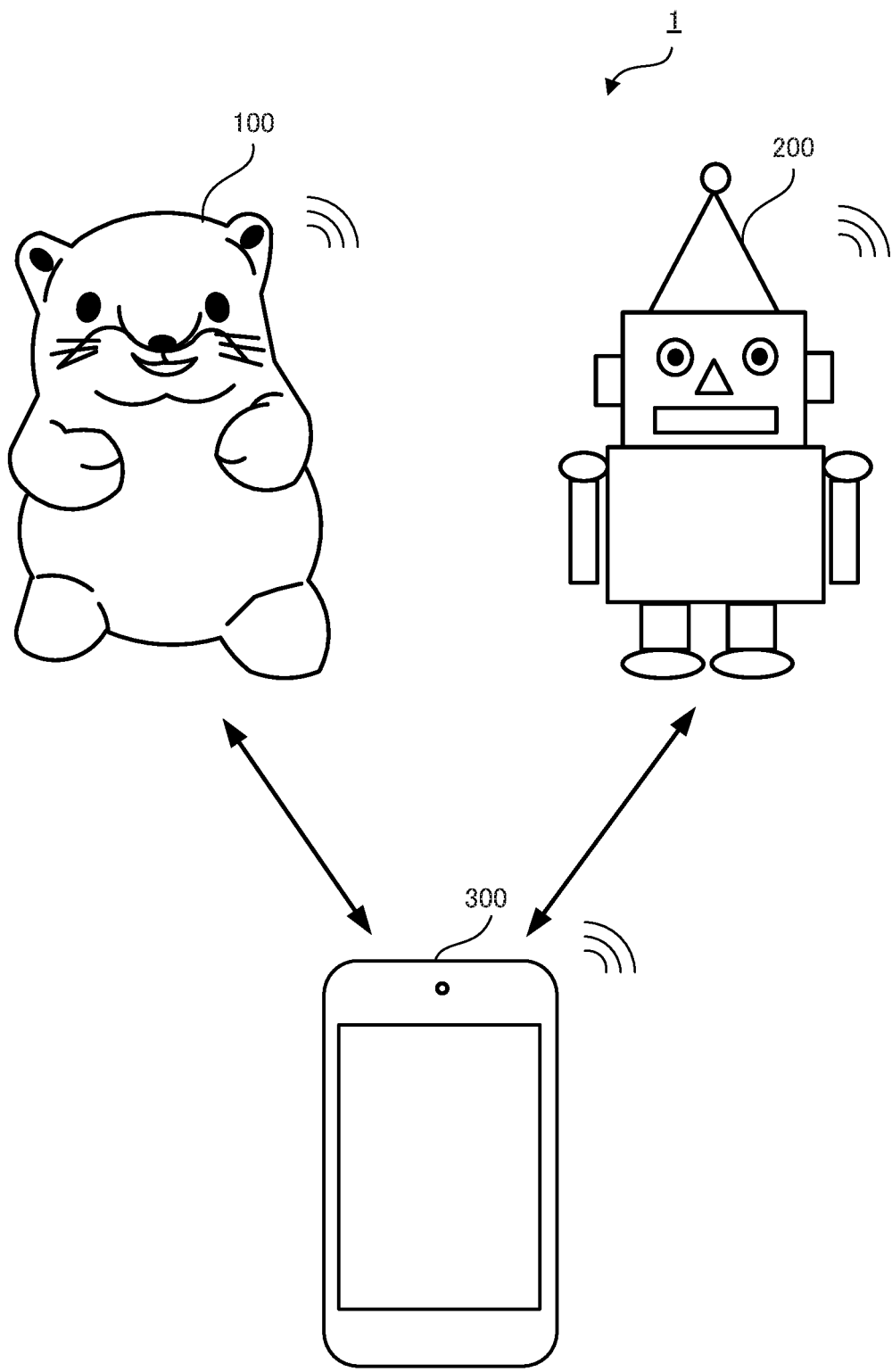
FIG. 1 is an illustration showing the appearance of the robot control system according to an embodiment.

As shown in FIG. 1, a robot control system 1 according to an embodiment of the present disclosure comprises a student role-playing robot 100, a teacher role-playing robot 200, and a communication terminal 300. The communication terminal 300 is connected to the student role-playing robot 100 and teacher role-playing robot 200 through short range radio communication for information exchange as indicated by the double-headed arrows.

The student role-playing robot 100 and teacher role-playing robot 200 have the appearance of, for example, a stuffed animal or a cartoon character. In this embodiment, the student role-playing robot 100 has the appearance of a stuffed animal giving a gentle impression so that the user feels amiable and the teacher role-playing robot 200 has the appearance of a robot giving an impression more formal than the student role-playing robot 100 by way of example. Needless to say, these forms are given by way of example and either one or both of the student role-playing robot 100 and teacher role-playing robot 200 may be a computer.

The communication terminal 300 is, for example, a smartphone, tablet-type communication terminal, personal computer, or the like. The communication terminal 300 communicates with the student role-playing robot 100 and teacher role-playing robot 200 to control behaviors of the student role-playing robot 100 and teacher role-playing robot 200. The communication terminal 300 outputs sound or images based on a running educational program to provide a learning service to the user. The content of a learning service can be anything. Here, a case of English conversation is described in which communication with the student role-playing robot 100 and teacher role-playing robot 200 is likely to contribute to the effect of learning.

The configurations of the devices of the robot control system 1 will be described hereafter. First, the configuration of the student role-playing robot 100 will be described.

Figure 2:
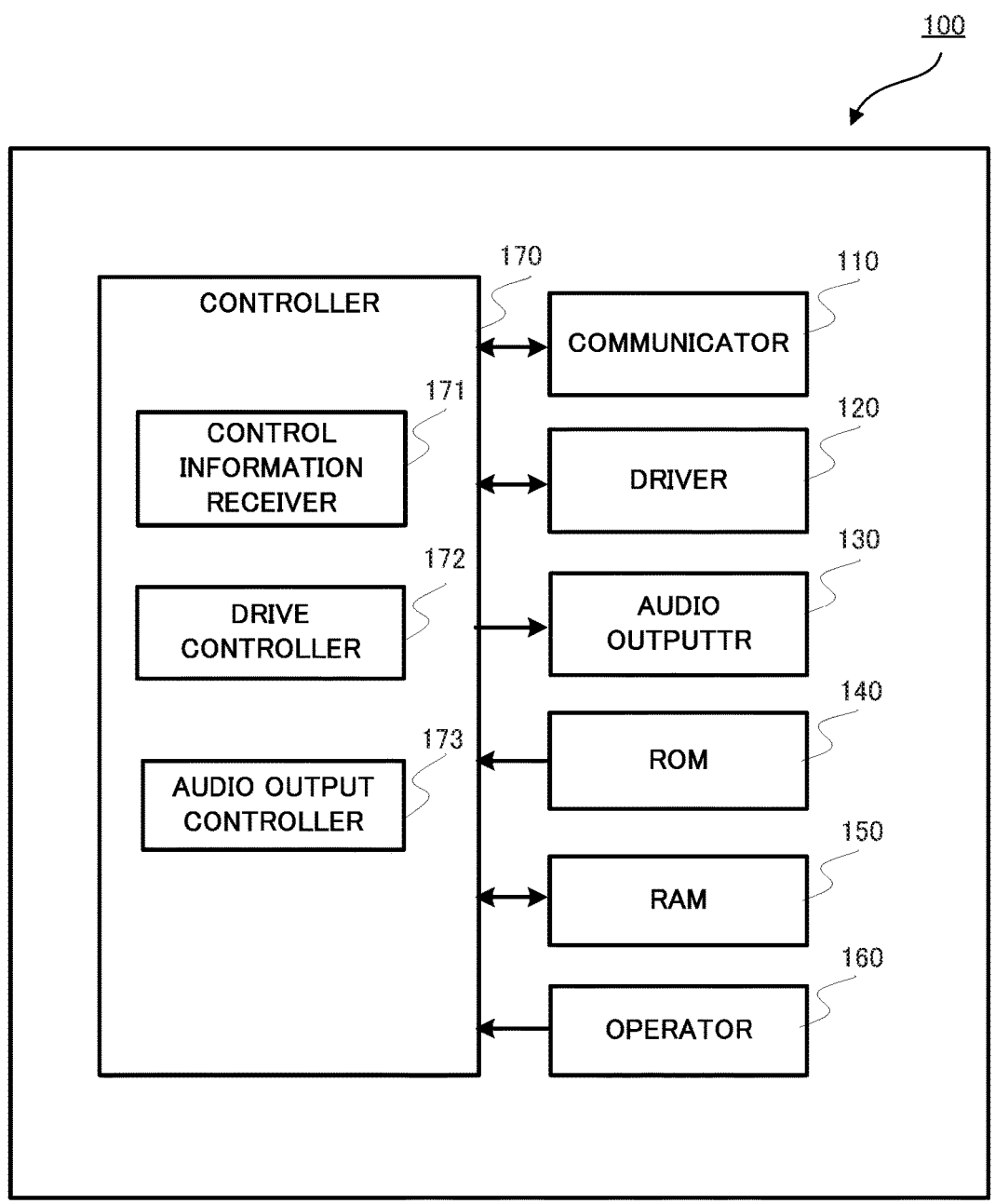
FIG. 2 is a block diagram showing an exemplary configuration of the student role-playing robot according to the embodiment.

As shown in FIG. 2, the student role-playing robot 100 comprises a communicator 110, a driver 120, an audio outputter 130, a read only memory (ROM) 140, a random access memory (RAM) 150, an operator 160, and a controller 170.

The communicator 110 comprises, for example, a radio frequency (RF) circuit, base band (BB) circuit, large scale integration (LSI) circuit, or the like. The communicator 110 transmits/receives signals via a not shown antenna to wirelessly communicate with the communication terminal 300. Here, the communicator 110 may be configured to wire-communicate with the communication terminal 300.

The driver 120 comprises, for example, a gear, a motor, an actuator, and the like. The driver 120 drives the components of the student role-playing robot 100 according to drive signals from the controller 170. For example, the driver 120 controls the tilt of the head of the student role-playing robot 100 to nod or shake or turn the head. Moreover, the driver 120 drives the student role-playing robot 100 to move the lips, blink, or move around. With such drive and audio output described later, the student role-playing robot 100 is configured to express the emotion, sight line, posture, and the like of the student role-playing robot 100.

The audio outputter 130 comprises, for example, a speaker and the like. The audio outputter 130 outputs sound according to audio signals from the controller 170. The content of output sound is mainly the content of speech of the student role-playing robot 100. Data presenting the content of speech are included in control information received by the communicator 110 from the communication terminal 300 described later.

The ROM 140 comprises a nonvolatile memory such as a flash memory and stores programs for the controller 170 to control various functions and various data.

The RAM 150 comprises a volatile memory and is used as the work area for the controller 170 to temporarily store data for executing various procedures.

The operator 160 comprises operation buttons, a touch panel, and the like. The operator 160 is, for example, an interface for receiving user operations such as power on/off and audio output volume adjustment.

The controller 170 is a processor and comprises a central processing unit (CPU) and the like. The controller 170 executes various programs stored in the ROM 140 to control the entire operation of the student role-playing robot 100.

Here, the functional configuration of the controller 170 of the student role-playing robot 100 is described. The controller 170 functions as a control information receiver 171, a drive controller 172, and an audio output controller 173.

The control information receiver 171 makes the communicator 110 receive control information from the communication terminal 300 and receives the received control information.

The drive controller 172 creates drive signals based on the control information received by the control information receiver 171 and controls the driver 120.

The audio output controller 173 creates audio signals based on the control information received by the control information receiver 171 and controls the audio outputter 130. Moreover, the audio output controller 173 controls the volume of sound output from the audio outputter 130 based on a user operation such as volume adjustment received by the operator 160.

The configuration of the student role-playing robot 100 is described above. The configuration of the teacher role-playing robot 200 will be described hereafter. Here, the configuration of the teacher role-playing robot 200 will be described in which the same components as those of the student role-playing robot 100 are referred to by the same reference numbers.

Figure 3:
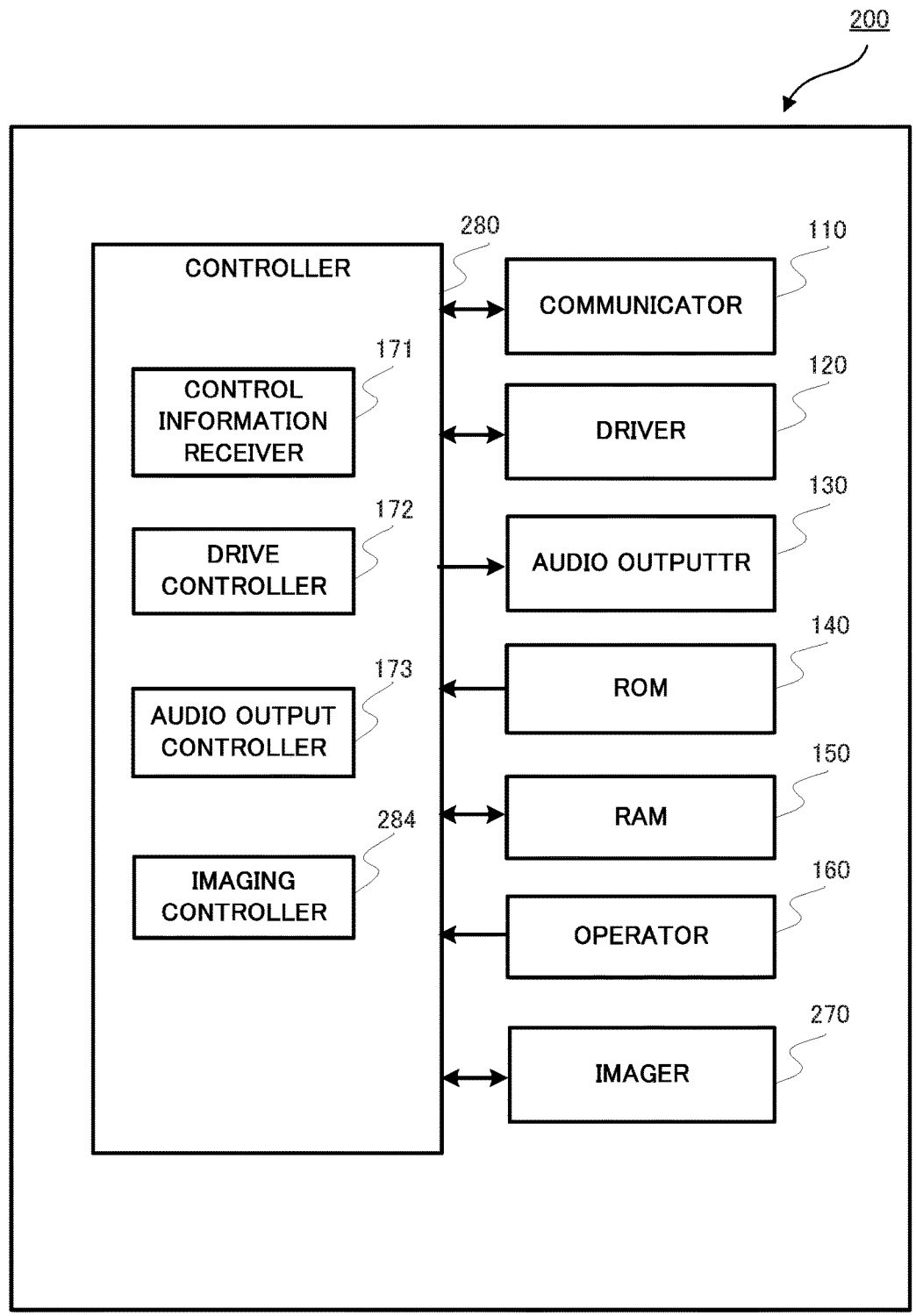
FIG. 3 is a block diagram showing an exemplary configuration of the teacher role-playing robot according to the embodiment.

As shown in FIG. 3, the teacher role-playing robot 200 comprises a communicator 110, a driver 120, an audio outputter 130, an ROM 140, an RAM 150, an operator 160, an imager 270, and a controller 280.

The imager 270 comprises, for example, a lens, an imaging element, and the like. The imager 270 captures an image of the face or body of the user and acquires a still image or video image presenting the user's posture, sight line, facial expression, and the like.

The controller 280 is a processor and comprises a CPU and the like. The controller 280 executes various programs stored in the ROM 140 to control the entire operation of the teacher role-playing robot 200.

Here, the functional configuration of the controller 280 of the teacher role-playing robot 200 is described. The controller 280 functions as a control information receiver 171, a drive controller 172, an audio output controller 173, and an imaging controller 284.

The control information receiver 171 makes the communicator 110 receive control information from the communication terminal 300 and receives the received control information.

The drive controller 172 creates drive signals based on the control information received by the control information receiver 171 and controls the driver 120. Like the driver 120 of the student role-playing robot 100, the driver 120 of the teacher role-playing robot 200 drives the components of the teacher role-playing robot 200 to express the emotion, sight line, posture, and the like of the teacher role-playing robot 200.

The audio output controller 173 creates audio signals based on the control information received by the control information receiver 171 and controls the audio outputter 130. The audio outputter 130 outputs sound according to the audio signals. The content of output sound is mainly the content of speech of the teacher role-playing robot 200. The content of speech of the teacher role-playing robot 200 includes problems and solutions for the user and student role-playing robot 100, complimentary words upon correct answers, and comforting words upon incorrect answers. Data presenting the content of speech are included in the control information received by the communicator 110 from the communication terminal 300 described later.

The imaging controller 284 controls the imager 270 to acquire a still image or video image and makes the communicator 110 transmit the acquired still image or video image to the communication terminal 300. Here, the imaging controller 284 may be configured to perform image recognition on a still image or video image, analyze the user's posture, facial expression, sight line, and the like, and transmit the analysis results to the communication terminal 300.

The configuration of the teacher role-playing robot 200 is described above. Here, the teacher role-playing robot 200 and the communication terminal 300 described layer may be configured as one integrated piece.

Figure 4:
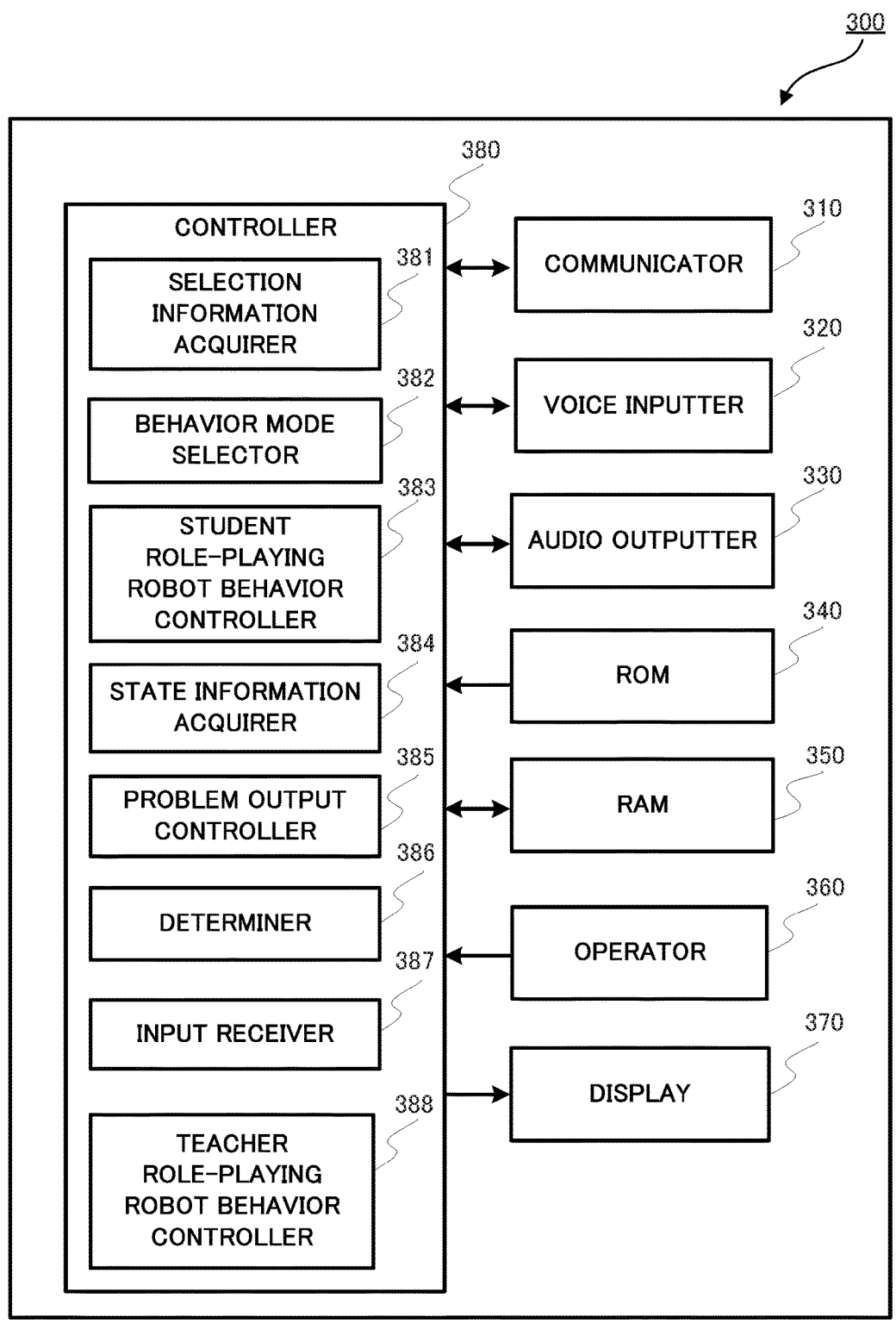
FIG. 4 is a block diagram showing an exemplary configuration of the communication terminal according to the embodiment.

The configuration of the communication terminal 300 will be described next. As shown in FIG. 4, the communication terminal 300 comprises a communicator 310, a voice inputter 320, an audio outputter 330, an ROM 340, an RAM 350, an operator 360, a display 370, and a controller 380.

The communicator 310 comprises, for example, a radio frequency (RF) circuit, base band (BB) circuit, large scale integration (LSI) circuit, or the like. The communicator 310 transmits/receives signals via a not shown antenna to wirelessly communicate with other communication devices (for example, the student role-playing robot 100, teacher role-playing robot 200, not shown access points, and the like). Here, the communicator 310 may be configured to wire-communicate with other communication devices.

The voice inputter 320 comprises, for example, a microphone and the like. The voice inputter 320 acquires speech of the user as voice information.

The audio outputter 330 comprises, for example, a speaker and the like. The audio outputter 330 outputs sound according to audio signals from the controller 380. The content of output sound is, for example, short music reproduced upon moving on to a next chapter in a learning curriculum, a beep sound reproduced upon a correct answer or incorrect answer, and the like. The audio data are read from the ROM 340.

The ROM 340 comprises a nonvolatile memory such as a flash memory and stores programs for the controller 380 to control various functions (for example, educational programs) and various data (for example, history of determination results described later).

The RAM 350 comprises a volatile memory and is used as the work area for the controller 380 to temporarily store data for executing various procedures.

The operator 360 comprises operation buttons, a touch panel, and the like. The operator 360 is an interface for the user to enter orders. The user enters orders to, for example, execute or stop an educational program, select educational contents, give an answer to a problem, and the like.

The display 370 comprises, for example, a liquid crystal display (LCD), electroluminescence (EL) display, or the like, and displays images according to image data entered from the controller 380.

The controller 380 is a processor and comprises a CPU and the like. The controller 380 executes various programs stored in the ROM 340 to control the entire operation of the communication terminal 300.

Here, the functional configuration of the controller 380 of the communication terminal 300 is described. The controller 380 functions as a selection information acquirer 381, an behavior mode selector 382, a student role-playing robot behavior controller 383, a state information acquirer 384, a problem output controller 385, a determiner 386, an input receiver 387, and a teacher role-playing robot behavior controller 388.

The selection information acquirer 381 acquires selection information. The selection information is information for selecting at least one or more behavior modes selected from multiple behavior modes. The multiple behavior modes include a rivalry mode for competing with the user and a friendly mode for being nice to the user. In this embodiment, for easier understanding, the multiple behavior modes comprise two behavior modes, a rivalry mode and a friendly mode, by way of example.

The selection information includes state information acquired by the state information acquirer 384 described later, information based on an behavior mode selection operation conducted by the user through the operator 360, and a correct answer rate calculated from the history of determination results stored in the ROM 340.

The behavior mode selector 382 selects one or more behavior modes based on the selection information acquired by the selection information acquirer 381. In this embodiment, since the multiple behavior modes comprise only two modes, the rivalry mode and friendly mode, the behavior mode selector 382 selects either the rivalry mode or the friendly mode.

The student role-playing robot behavior controller 383 controls behavior of the student role-playing robot 100 based on the one or more behavior modes selected by the behavior mode selector 382. The student role-playing robot behavior controller 383 makes the student role-playing robot 100 perform a different behavior depending, for example, on whether the selected behavior mode is the rivalry mode or the friendly mode.

Moreover, the student role-playing robot behavior controller 383 controls behavior of the student role-playing robot 100 based on determination results of the determiner 386. The student role-playing robot behavior controller 383 makes the student role-playing robot 100 perform a different behavior depending, for example, on whether the determination result indicates a correct answer or an incorrect answer. In other words, the student role-playing robot 100 changes its behavior according to the state of the user's answer.

The student role-playing robot behavior controller 383 changes any one or more of the answering time, frequency of answering, and answer content in the behavior of the student role-playing robot 100 based on the state information acquired by the state information acquirer 384.

The state information acquirer 384 acquires state information of the user. The state information of the user includes any one or more of the user's frequency of learning, progress in learning, rate of learning interrupted, posture, sight line, diction, facial expression, voice tone, answering time, and frequency of speech.

The problem output controller 385 executes controls for outputting problems for the user to answer. The controls for outputting problems include any one or more controls of display control for displaying a problem statement on the display 370, audio output control for making the audio outputter 330 produce audio output of a problem statement, and audio output control for making the audio outputter 130 of the teacher role-playing robot 200 produce audio output of a problem statement through transmission of control information. Generally, the communication terminal 300 transmits control information to the teacher role-playing robot 200 and the teacher role-playing robot 200 produces audio output of a problem statement based on the control information. In such a case, the audio outputter 130 of the teacher role-playing robot 200 functions as problem outputter.

Here, the problem output controller 385 also executes controls for outputting listening practice materials for the user such as English stories and solutions to problems.

The determiner 386 determines whether the content of the user's answer to a problem output by the problem output controller 385 is correct. The determiner 386 determines whether, for example, the content of the solution stored in the ROM 340 matches the content of the user's answer. The determiner 386 stores the history of determination results in the ROM 340.

The input receiver 387 receives user input. The user input includes the user's speech acquired by the voice inputter 320 as voice signals (for example, an answer content) and user operations received by the operator 360.

The teacher role-playing robot behavior controller 388 controls behavior of the teacher role-playing robot 200.

The configuration of the communication terminal 300 is described above. The control procedure executed by the controller 380 of the communication terminal 300 will be described hereafter with reference to the flowchart of FIG. 5. This control procedure includes the robot control procedure to control behaviors of the student role-playing robot 100 and teacher role-playing robot 200.

This control procedure starts when, for example, the controller 380 of the communication terminal 300 executes an educational program stored in the ROM 340. First, the state information acquirer 384 of the controller 380 acquires state information of the user (Step S101).

Specifically, the state information acquirer 384 of the controller 380 makes the teacher role-playing robot 200 acquire a still image or video image presenting the user's posture, sight line, facial expression, and the like. Then, the state information acquirer 384 of the controller 380 makes the communicator 310 receive the still image or video image and preforms image recognition on the received still image or video image. As a result, the state information acquirer 384 of the controller 380 acquires as state information the user's posture that is good or not, his sight line that is relatively off or not, his facial expression that is lively or not from the way the eyes are opened, and the like.

Moreover, the state information acquirer 384 of the controller 380 makes the voice inputter 320 acquire speech of the user as voice information and performs voice recognition on the voice information. As a result, the state information acquirer 384 of the controller 380 acquires as state information diction, voice tone, and the like of the user's answer.

Moreover, the state information acquirer 384 of the controller 380 acquires as state information the answering time and frequency of speech of the user's answer received in the past (over a given length of immediately preceding time). Moreover, the state information acquirer 384 of the controller 380 acquires as state information the data such as the frequency of learning, progress in learning, rate of learning interrupted, and the like with reference to the ROM 340.

Then, the selection information acquirer 381 of the controller 380 acquires selection information for selecting a behavior mode (Step S102).

Specifically, the selection information acquirer 381 of the controller 380 acquires as selection information the state information acquired by the state information acquirer 384 in the Step S101. Moreover, the selection information acquirer 381 of the controller 380 also acquires as selection information a correct answer rate calculated from the history of determination results stored in the ROM 340.

When the user conducts a behavior mode selection operation on the operator 360, information based on the selection operation is acquired as selection information. Here, when a selection operation is conducted by the user, the selection information acquirer 381 of the controller 380 gives priority to and employs as selection information the information based on the user selection operation over the state information acquired by the state information acquirer 384.

Then, the behavior mode selector 382 of the controller 380 selects either behavior mode, the rivalry mode or friendly mode, based on the selection information acquired by the selection information acquirer 381 in the Step S102 (Step S103).

When the selection information is the state information and a correct answer rate, the above selection is made based on comprehensive evaluation of those. For example, the state information of the user having a good posture, his sight line not off, eyes wide-open (lively facial expression), high frequency of learning, major progress in learning, and low rate of learning interrupted, and the like and information of a high correct answer rate indicate that the user has a high motivation for learning.

When there is a large amount of information indicating that the user has a high motivation for learning, the behavior mode selector 382 of the controller 380 selects the rivalry mode. On the other hand, when there is a small amount of information indicating that the user has a high motivation for learning, the behavior mode selector 382 of the controller 380 selects the friendly mode.

On the other hand, when the selection information is information based on a user selection operation, the behavior mode selector 382 of the controller 380 selects either the rivalry mode or friendly mode the user has selected.

The controller 380 executes the behavior control procedure of the student role-playing robot 100 and teacher role-playing robot 200 based on the above conditions (Step S104). Specifically, the student role-playing robot behavior controller 383 of the controller 380 controls behavior of the student role-playing robot 100 based on the behavior mode selected in the Step S103. Moreover, the teacher role-playing robot behavior controller 388 of the controller 380 makes the teacher role-playing robot 200 perform behavior collaborative with behavior of the student role-playing robot 100.

When the behavior mode is the rivalry mode, the student role-playing robot behavior controller 383 of the controller 380 makes the student role-playing robot 100 produce audio output of a message of which the content is competitive, triumphal, mean, or contentious to the user, or the like. Moreover, the student role-playing robot behavior controller 383 of the controller 380 shortens the answering time in which the student role-playing robot 100 answers since a problem is output or increases the frequency of answering of the student role-playing robot 100 so that the answer content of the student role-playing robot 100 includes many correct answer contents.

When the behavior mode is the friendly mode, the student role-playing robot behavior controller 383 of the controller 380 makes the student role-playing robot 100 produce audio output of a message of which the content encourages, congratulates, or cares for the user, gives a clue for the solution to a problem, gives a wrong answer, or the like. Moreover, the student role-playing robot behavior controller 383 of the controller 380 extends the answering time in which the student role-playing robot 100 answers since a problem is output or decreases the frequency of answering of the student role-playing robot 100 so that the answer content of the student role-playing robot 100 includes many incorrect answer contents.

Here, the teacher role-playing robot behavior controller 388 of the controller 380 makes the teacher role-playing robot 200 perform behavior collaborative with the above behavior of the student role-playing robot 100. For example, the teacher role-playing robot behavior controller 388 of the controller 380 makes the teacher role-playing robot 200 produce audio output of contents praising the student role-playing robot 100 or the user who gives the correct answer first or comforting the user who gives an incorrect answer. Moreover, the teacher role-playing robot behavior controller 388 and student role-playing robot behavior controller 383 of the controller 380 cooperate to produce audio output of contents for the student role-playing robot 100 and teacher role-playing robot 200 to praise or comfort the user together.

The control procedure executed by the controller 380 of the communication terminal 300 is described above. The above control procedure is repeatedly executed on a periodical basis.

Here, an example of the behavior control procedure of the student role-playing robot 100 and teacher role-playing robot 200 (Step S104) executed by the controller 380 of the communication terminal 300 is described with reference to the flowchart of FIG. 6.

Here, the behavior control procedure from the problem output controller 385 of the controller 380 executing control to output a problem to executing control to output a solution is described.

First, the controller 380 determines whether the behavior mode is the rivalry mode (Step S201).

If the behavior mode is the rivalry mode (Step S201; Yes), the student role-playing robot behavior controller 383 of the controller 380 controls the student role-playing robot 100 to answer in the rivalry mode (Step S202). For example, the student role-playing robot behavior controller 383 of the controller 380 makes the student role-playing robot 100 give an answer of a correct answer content in a short answering time.

Subsequently, if the user answers, the determiner 386 of the controller 380 determines whether the content of the user's answer is correct (Step S203).

If the content of the user's answer is correct (Step S203; Yes), the student role-playing robot behavior controller 383 of the controller 380 makes the student role-playing robot 100 perform a behavior for a correct answer (Step S204). For example, the student role-playing robot behavior controller 383 of the controller 380 makes the student role-playing robot 100 produce audio output of a message of which the content suggests that the student role-playing robot 100 feels upset for the loss, praises the user, or the like. In doing so, the teacher role-playing robot behavior controller 388 of the controller 380 makes the teacher role-playing robot 200 produce audio output of a message of which the content praises the user or the like.

If the content of the user's answer is wrong (Step S203; No), the student role-playing robot behavior controller 383 of the controller 380 makes the student role-playing robot 100 perform an behavior for an incorrect answer (Step S205). For example, the student role-playing robot behavior controller 383 of the controller 380 makes the student role-playing robot 100 produce audio output of a message of which the content suggests that the student role-playing robot 100 is happy with the win or the like. In doing so, the teacher role-playing robot behavior controller 388 of the controller 380 makes the teacher role-playing robot 200 produce audio output of a massage of which the content comforts the user, praises the student role-playing robot 100, or the like.

On the other hand, if the behavior mode is the friendly mode in the Step S201 (Step S201; No), the student role-playing robot behavior controller 383 of the controller 380 controls the student role-playing robot 100 to answer in the friendly mode (Step S206). For example, the student role-playing robot behavior controller 383 of the controller 380 makes the student role-playing robot 100 give an answer of an incorrect answer content in a long answering time.

Subsequently, if the user answers, the determiner 386 of the controller 380 determines whether the content of the user's answer is correct (Step S207).

If the content of the user's answer is correct (Step S207; Yes), the student role-playing robot behavior controller 383 of the controller 380 makes the student role-playing robot 100 perform an behavior for a correct answer (Step S208). For example, the student role-playing robot behavior controller 383 of the controller 380 makes the student role-playing robot 100 produce audio output of a message of which the content suggests that the student role-playing robot 100 is happy for the user, praises the user, or the like. In doing so, the teacher role-playing robot behavior controller 388 of the controller 380 makes the teacher role-playing robot 200 produce audio output of a message of which the content praises the user or the like.

If the content of the user's answer is wrong (Step S207; No), the student role-playing robot behavior controller 383 of the controller 380 makes the student role-playing robot 100 perform an behavior for an incorrect answer (Step S209). For example, the student role-playing robot behavior controller 383 of the controller 380 makes the student role-playing robot 100 produce audio output of a message of which the content suggests that the student role-playing robot 100 is sad for the user, encourages the user, or the like. In doing so, the teacher role-playing robot behavior controller 388 of the controller 380 makes the teacher role-playing robot 200 produce audio output of a message of which the content comforts the user or the like.

After finishing the processing in the Steps S201 to S209, the controller 380 stores in the ROM 340 the answering time and frequency of speech of the user's answer, the history of determination results, and the like. The stored data are used as the state information in the Step S101 as described above. Then, the behavior control procedure ends. Then, the problem output controller 385 of the controller 380 executes control to output the solution. Then, as the problem output controller 385 of the controller 380 executes control to output a next problem again, the behavior control procedure in the Steps S201 to S209 is executed again.

As described above, the controller 380 of the communication terminal 300 of this embodiment acquires selection information, and selects at least one or more behavior modes (rivalry mode or friendly mode) from multiple behavior modes (rivalry mode and friendly mode). Then, the controller 380 of the communication terminal 300 controls behavior of the student role-playing robot 100 based on the selected behavior mode.

With the above configuration, the user can have communication with the student role-playing robot 100. Moreover, the controller 380 of the communication terminal 300 controls behavior of the student role-playing robot 100 so as to operate in the behavior mode selected from multiple behavior modes. Therefore, the student role-playing robot 100 can perform various behaviors according to the state of the user.

In such a case, the user is inspired through communication with the student role-playing robot 100 that is another student. Therefore, the user who is a learner is more motivated for learning.

Particularly, the controller 380 of the communication terminal 300 makes the student role-playing robot 100 perform different behaviors in the rivalry mode for competing with user and in the friendly mode for being nice to the user. In such a case, the behavior of the student role-playing robot 100 can serve to set up a situation where the user competes with another student or is encouraged by another student, whereby the user who is a learner is more motivated for learning.

The controller 380 of the communication terminal 300 makes the teacher role-playing robot 200 perform behavior collaborative with behavior of the student role-playing robot 100. The collaborative behaviors of the student role-playing robot 100 and teacher role-playing robot 200 (dialogue) can serve to set up an atmosphere in which the user is more motivated for learning.

The controller 380 of the communication terminal 300 acquires state information and a correct answer rate of the user and acquires them as selection information for selecting an behavior mode. Therefore, the controller 380 of the communication terminal 300 can control behavior of the student role-playing robot 100 in the behavior mode according to the state of the user and make the student role-playing robot 100 perform an behavior suitable for the state of the user.

Moreover, the controller 380 of the communication terminal 300 acquires various kinds of state information and changes based on the state information any one or more of the answering time, frequency of answering, and answer content in the behavior of the student role-playing robot 100. In such a case, the controller 380 of the communication terminal 300 can make the student role-playing robot 100 perform an answer behavior suitable for the state of the user.

Moreover, the controller 380 of the communication terminal 300 determines whether the content of the user's answer to a problem is correct and controls behavior of the student role-playing robot 100 based on the determination result. In such a case, the behaviors of the student role-playing robot 100 and teacher role-playing robot 200 according to whether the result is correct or incorrect make possible behaviors to support the user in learning such as caring for an upset user and giving the user confidence, whereby the user can more be motivated for learning.

An embodiment is described above. The above embodiment is given by way of example. The specific configurations and processing contents of the devices are not confined to what is described in the above embodiment and can be modified as appropriate. Therefore, modified embodiments of the above embodiment will be described hereafter.

Modified Embodiments

In the above embodiment, the controller 380 of the communication terminal 300 controls the student role-playing robot 100 and teacher role-playing robot 200. However, a control device independent from the student role-playing robot 100, teacher role-playing robot 200, and communication terminal 300 may be configured to control the student role-playing robot 100 or teacher role-playing robot 200. Moreover, the student role-playing robot 100 and teacher role-playing robot 200 may communicably be connected and support the user in learning in a mutually collaborative manner.

In the above embodiment, the robot control system 1 comprises the student role-playing robot 100, teacher role-playing robot 200, and communication terminal 300. However, the robot control system of the present disclosure is not confined thereto.

For example, the robot control system 1 may be configured to comprise a problem output device in place of the teacher role-playing robot 200 and communication terminal 300. In such a case, it may be possible that the problem output device outputs problems to the user and student role-playing robot 100, and the student role-playing robot 100 answers the problems based on at least one or more behavior modes selected from multiple behavior modes. Moreover, the robot control system 1 may be configured to comprise a problem output device in place of the communication terminal 300.

Moreover, the above embodiment may be realized only by the student role-playing robot 100, instead of the robot control system 1 comprising the student role-playing robot 100, teacher role-playing robot 200, and communication terminal 300. For example, an embodiment in which three parties, a teacher, a learner, and the student role-playing robot 100, are involved in learning may be implemented.

In such a case, the student role-playing robot 100 comprises the selection information acquirer 381, student role-playing robot behavior controller 383, determiner 386, input receiver 387, the voice inputter 320 and the like provided to the communication terminal 300. The student role-playing robot 100 is configured to operate in response to the teacher's speech as well. Here, the control procedure for the student role-playing robot 100 to recognize the content of free speech of the teacher and respond tends to be complex. Then, for a simplified control procedure, the student role-playing robot 100 may be configured to react and respond to keywords included in the content of speech of the teacher.

For example, answer contents relating to keywords are pre-stored in the ROM 140 of the student role-playing robot 100. Then, it is possible for the student role-playing robot 100 to recognize through voice recognition keywords included in the speech of the teacher entered from the voice inputter 320 and perform audio output of an answer content stored in the ROM 140 from the audio outputter 130. For example, it may be possible that when a speech of a teacher includes keywords "Problem 1" and "Answer to the question," the student role-playing robot 100 produces audio output of the answer content to the problem 1.

In the robot control system 1 of the above embodiment, since the controller 380 of the communication terminal 300 controls the student role-playing robot 100 and teacher role-playing robot 200, the controller 380 of the communication terminal 300 controls the entire system. However, it may be possible that the function of the controller 380 of the communication terminal 300 as the robot control device is distributed to the student role-playing robot 100 or teacher role-playing robot 200 and the teacher role-playing robot 200 or a problem output device and the communication terminal 300 cooperate to realize the function as the robot control device.

In the above embodiment, the teacher role-playing robot 200 is configured to perform behavior collaborative with behavior of the student role-playing robot 100. The teacher role-playing robot 200 may be configured to perform behavior corresponding to the state information of the user like the behavior of the student role-playing robot 100. The student role-playing robot 100 and teacher role-playing robot 200 may be configured to change behaviors depending on the response state of the user to the teacher role-playing robot 200 or the response state of the user to the student role-playing robot 100. The response state means the state information of the user, the result of determining whether the user's answer is correct, and the like.

For example, the robot control system 1 may be configured so that the controller 170 of the student role-playing robot 100 controls the behavior of its own device. In other words, the controller 170 of the student role-playing robot 100 may be configured to comprise the selection information acquirer 381 and student role-playing robot behavior controller 383 and receive selection information, select an behavior mode of its own device, and control the behavior of its own device. In such a case, the student role-playing robot 100 receives selection information from another device (for example, the teacher role-playing robot 200, communication terminal 300, or a problem output device). Moreover, it may be possible that the student role-playing robot 100 further comprises the imager 270 and the controller 170 of the student role-playing robot 100 comprises the state information acquirer 384.

Figure 5:
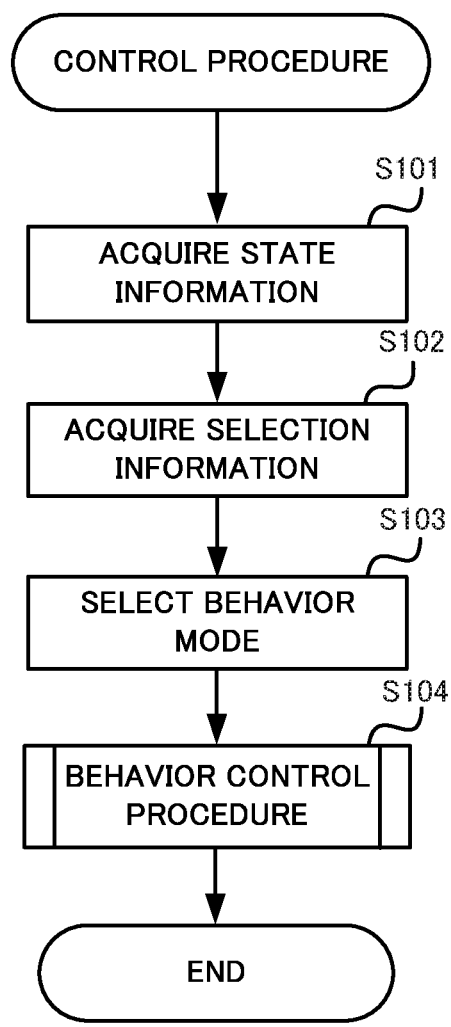
FIG. 5 is a flowchart of the control procedure of the communication terminal according to the embodiment.
Figure 6:
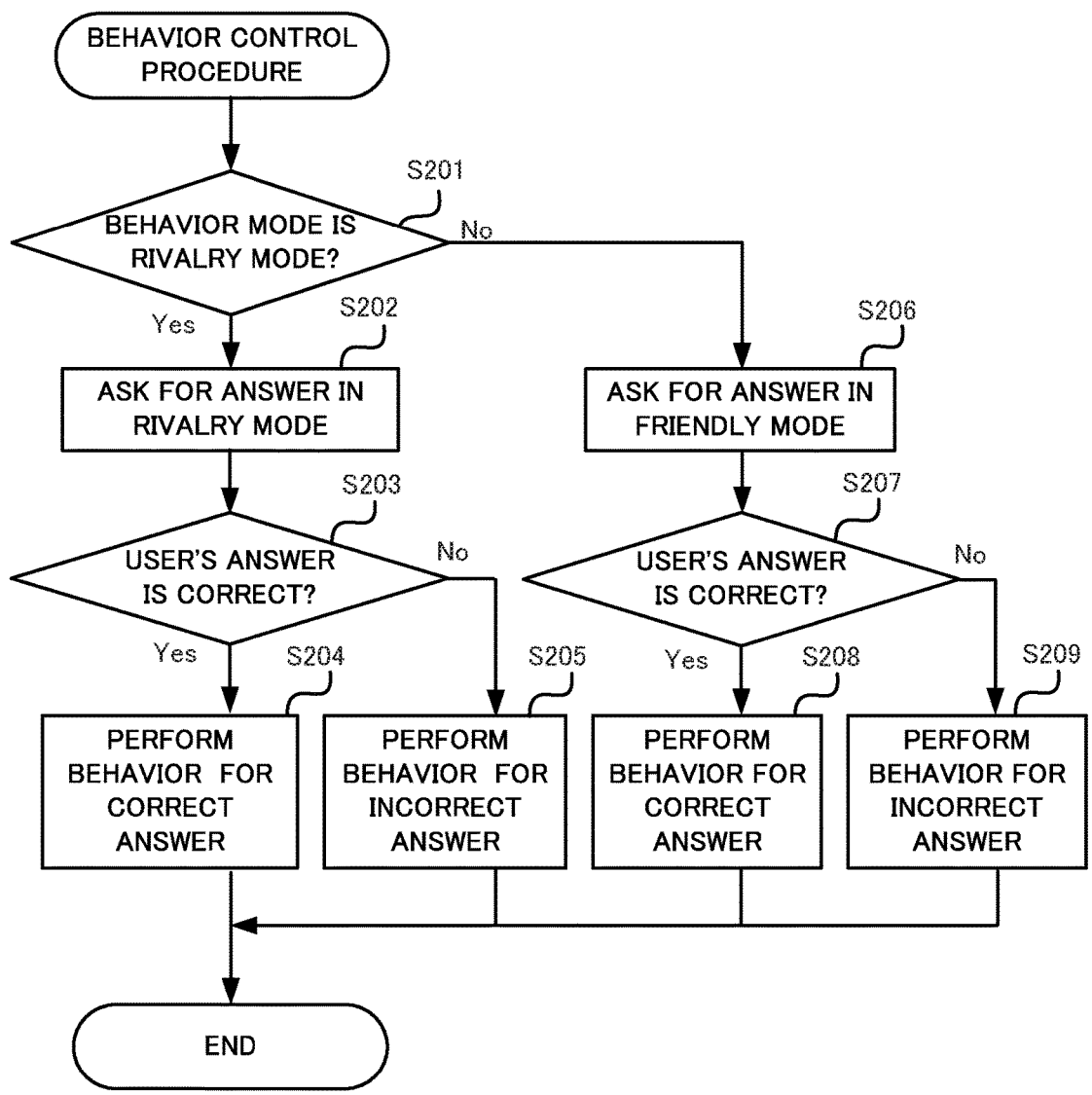
FIG. 6 is a flowchart of the behavior control procedure of the communication terminal according to the embodiment.

The control procedure executed by the controller 380 of the communication terminal 300 is not restricted to the flowcharts of FIGS. 5 and 6 and can be modified as appropriate. For example, the order of steps may be changed or the state information and selection information may be acquired in the middle of execution of the behavior control procedure.

In the above embodiment, only two behavior modes, a rivalry mode and a friendly mode, are provided by way of example. However, three or more behavior modes may be provided. For example, behavior modes according to the frequency of learning and progress in learning may be added.

For example, the controller 380 of the communication terminal 300 may execute control in an behavior mode in which the student role-playing robot 100 performs an behavior to look cheerful and happy when the frequency of learning is high, and in an behavior mode in which the student role-playing robot 100 performs an behavior to look sad or an behavior to look delighted to have the user at the learning start time when the frequency of learning is low.

The controller 380 of the communication terminal 300 may execute control so that more English words are included in the content of speech of the student role-playing robot 100 when the progress in learning is greater than a reference value and more Japanese words are included in the content of speech of the student role-playing robot 100 when the progress in learning is poorer than a reference value.

Moreover, the robot control device according to the present disclosure may realize the functions of the communication terminal 300 by, for example, a computer executing programs, not by the communication terminal 300. The programs for realizing the functions of the communication terminal 300 may be stored on a non-transitory computer-readable recording medium such as a universal serial bus (USB) memory, compact disc read only memory (CD-ROM), digital versatile disc (DVD), and hard disc drive (HDD), or downloaded on a computer via a network.

Moreover, the present disclosure may be realized by the following learning device. Here, the learning device can be any device used for the user to learn such as a robot, communication device, display device, computer, and voice input/output device.

The present disclosure may be realized by a learning system comprising multiple learning devices having voice inputter and/or visual information acquirer and audio outputter and/or visual information outputter and operating in a collaborative manner. The linked behavior may be realized by intention indicater which indicates "agreement" between learning devices or between a learner and a learning device, or intention indicater which indicates "disagreement" between a learner and a learning device.

With each of the multiple learning devices having "a pseudo state of emotion," the linked behavior may be realized by intention indicater which indicates "emotion" between learning devices or between a learner and a learning device. The intention indicater may be configured to change the indication of intention depending on the degree of progress in learning, level of proficiency, and state of emotion. For example, the intention indicationer indicates an intention through, for example, uttered words, motion of a learning device, or the like.

At least one of the learning devices may be configured to have driveer and turn in accordance with speech of a device other than that learning device or the learner. At least one of the learning devices may be configured to have mimic eyes and change the direction of eyes in accordance with speech of a device other than that learning device or the learner.

At least one of the learning devices may be configured to have a mimic mouth and move the mouth while speaking. Any one of the multiple learning devices may be in charge of centralized control on its own device and other learning devices and the other learning devices may be passive devices.

It may be possible that the other passive learning devices comprise an audio output device and the learning device in charge of centralized control has conversations with the other learning devices (the third party) and the user, thereby realizing a virtually tripartite conversation. In such a case, the learning device in charge of centralized control may be configured to perform voice recognition not only on speech of the user to its own device but also on speech of the user to the other learning devices (the third party).

The other learning devices (the third party) may have the lip synchronization function of changing the display of a mouth or the way the mouth is opened upon reception of voice input from the learning device in charge of centralized control or the user. The display of a mouth is, for example, display by emission of a light emitting diode (LED). The multiple learning devices each may show whom they are talking to by their posture, eye direction, or the like.

The posture, eye direction, or the like may be controlled based, for example, on the positions or orientations of the user and other learning devices (for example, the third party) acquired by the visual information acquirer of its own device (for example, the learning device in charge of centralized control). Moreover, the voice inputter of its own device (for example, the learning device in charge of centralized control) may acquire voice of the user and other learning devices (for example, the third party) and the posture, eye direction, or the like may be controlled based on the positions or orientations of the user and other learning devices (for example, the third party) obtained from the voice recognition processing on the voice.

The multiple learning devices may be configured to react to speech of the user in a collaborative manner such as nodding, being surprised, and being delighted. It is preferable that the learning devices react with time lags. For example, the multiple learning devices may indicate their intention such as "That's incredible" and "Yeah, yeah!" to each other so that the multiple learning devices set up an atmosphere to praise the user together.

Moreover, a learning device may react to speech of another learning device such as nodding, and the reaction may include indication of intention of urging the user to agree.

Here, when the learning device is a display device, the indication of intention or the like may be expressed by motion of a displayed object (a character image) on the planar display device, not motion of an object.

A preferred embodiment and modified embodiments of the present disclosure are described above. The present invention is not confined to the particular embodiment. The present disclosure includes the invention described in the scope of claims and the range equivalent thereto.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A robot control device comprising:
   a controller, wherein the controller:
      controls behavior of a student role-playing robot so that the student role-playing robot answers a problem that is output for a user to answer, the problem being output to the user and the student role-playing robot, with the student role-playing robot playing a role of a student learning together with the user,
      determines, as a determination result, whether a content of an answer made by the user in response to the problem is correct, and controls the behavior of the student role-playing robot based on the determination result, and
      acquires selection information for selecting at least one behavior mode from among multiple behavior modes, selects the at least one behavior mode based on the selection information acquired by the controller, and controls the behavior of the student role-playing robot based on the at least one behavior mode selected by the controller.

2. The robot control device according to claim 1, further comprising a memory for storing a history of the determination results,
wherein the controller acquires a correct answer rate calculated from the history of the determination results stored in the memory as the selection information.

3. The robot control device according to claim 1, wherein the multiple behavior modes include a rivalry mode for competing with the user and a friendly mode for being nice to the user.

4. The robot control device according to claim 1, wherein the controller acquires state information of the user and controls the behavior of the student role-playing robot depending on the state information acquired by the controller.

5. The robot control device according to claim 4, wherein:
the state information acquired by the controller includes at least one of the user's frequency of learning, progress in learning, rate of learning interrupted, posture, sight line, diction, facial expression, voice tone, answering time, and frequency of speech, and
at least one of an answering time, frequency of answering, and answer content in the behavior of the student role-playing robot is changed based on the state information.

6. A robot control device including a controller, wherein the controller:
controls behavior of a student role-playing robot so that the student role-playing robot answers a problem that is output for a user to answer, the problem being output to the user and the student role-playing robot, with the student role-playing robot playing a role of a student learning together with the user,
selects a behavior control mode from among multiple behavior control modes including a rivalry mode for competing with the user and a friendly mode for being nice to the user, and
controls the behavior of the student role-playing robot so that (i) an answering time from when the problem is output to when the student role-playing robot answers the problem is shorter in a case in which the rivalry mode is selected as the behavior control mode as compared to a case in which the friendly mode is selected as the behavior control mode, (ii) a frequency at which the student role-playing robot answers the problem is higher in a case in which the rivalry mode is selected as the behavior control mode as compared to a case in which the friendly mode is selected as the behavior control mode, or (iii) an accuracy rate at which the student role-playing robot accurately answers the problem is higher in a case in which the rivalry mode is selected as the behavior control mode as compared to a case in a case in which the friendly mode is selected as the behavior control mode.

7. The robot control device according to claim 1, wherein the robot control device is provided outside of the student role-playing robot, and
wherein the controller:
controls an outputter provided separately from the student role-playing robot so that the outputter outputs the problem, and
controls the behavior of the student role-playing robot so that the student role-playing robot answers the problem with the student role-playing robot playing the role of the student learning together with the user.

8. The robot control device according to claim 1, wherein the robot control device is provided inside of the student role-playing robot, and
wherein the controller:
makes the student role-playing robot recognize the problem, and
controls the behavior of the student role-playing robot so that the student role-playing robot answers the recognized problem with the student role-playing robot playing the role of the student learning together with the user.

9. A robot controlled by the robot control device according to claim 1.

10. A robot controlled by the robot control device according to claim 6.

* * * * *

UNITED STATES PATENT AND TRADEMARK OFFICE
CERTIFICATE OF CORRECTION

PATENT NO. : 10,490,095 B2
APPLICATION NO. : 15/391825
DATED : November 26, 2019
INVENTOR(S) : Kaori Kadosawa It is certified that error appears in the above-identified patent and that said Letters Patent is hereby corrected as shown below:

In the Claims

Column 16, Line 13, delete "to a case in a case" and insert --to a case--.

Signed and Sealed this
Eleventh Day of February, 2020

Andrei Iancu
*Director of the United States Patent and Trademark Office*